Feb. 8, 1955          D. B. MYERS          2,701,599
TRACTION CHAIN LINK
Filed Nov. 23, 1951
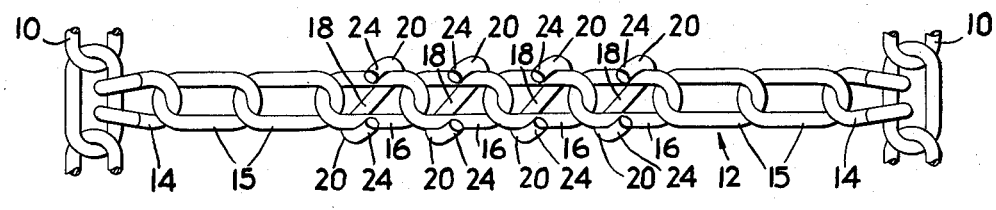
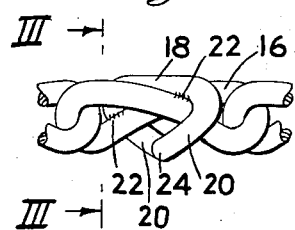
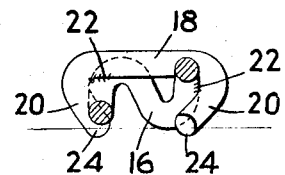
*INVENTOR.*
Don B. Myers
BY
Bean, Brooks, Buckley & Bean.
*ATTORNEYS*

United States Patent Office 2,701,599
Patented Feb. 8, 1955

2,701,599

TRACTION CHAIN LINK

Don B. Myers, Kenmore, N. Y., assignor to Columbus McKinnon Chain Corporation, Tonawanda, N. Y.

Application November 23, 1951, Serial No. 257,729

1 Claim. (Cl. 152—245)

This invention relates to links in automotive vehicle tire chains, and this application is an improvement over traction chain links such as those disclosed in application Serial No. 435,333, filed June 8, 1954, by William H. Devonshire, which is a continuation-in-part of each of applications Serial Nos. 102,577 and 209,882, filed July 1, 1949, and February 7, 1951, respectively, both of which have become abandoned.

One of the objects of the present invention is to provide a still further improved traction chain link which operates with improved traction effects and is of further increased wearing life.

Another object of the invention is to provide an improved traction chain link for rubber tired vehicle wheels, which presents to the roadway a traction surface of improved rugosity and to the tire tread a generally flat surface free from tire cutting protuberances.

Another object of the invention is to provide an improved traction chain link which embodies an improved form of transverse reinforcing bar.

Another object of the invention is to provide in combination with a traction chain link of the "twisted" type, an improved bar reinforcement arrangement which provides both improved reinforcing of the chain link and improved traction characteristics.

Another object of the invention is to embody in a transverse welded bar reinforced traction chain type link a bar which is of improved shape so as to reinforce in improved manner the welded connection between the link and the bar.

Other objects and advantages of the invention will appear from the specification hereinafter.

In the drawing:

Fig. 1 is a fragmentary illustration of a tire chain including a cross chain member having traction links of the present invention; the roadway engaging side of the cross chain member being shown in plan view;

Fig. 2 is a fragmentary side elevation of the cross chain member; and

Fig. 3 is a section taken along line III—III of Fig. 2.

The invention is applicable to any style traction chain such as may be applied to rubber tired vehicle wheels; but in the drawing the invention is illustrated by way of an example in conjunction with a typical style automobile traction chain including a pair of side chains 10—10 which are adapted to be arranged against the opposite side walls of an automobile tire. Such side chains are interconnected by a series of transverse cross chains 12 which are thus arranged to extend across the tread portion of the tire at suitable intervals therearound. In the drawing each cross chain member is illustrated to comprise a pair of end hooks 14—14; body links 15, and tread links 16. As shown, the links 15, and the tread links 16 are of the "twisted" link type, such as are made from heavy wire stock pieces bent into loop form and welded together at their abutting ends, and then twisted so that in end view the opposite end portions of the links are relatively displaced at a substanially 90° angle.

In accord with the present invention the tread links 16 are each reinforced by a bar of metal wire 18 which is disposed to extend diagonally transversely over the tire contacting side of the link 16 and is then bent or crimped at its opposite ends around the link as indicated at 20. The reinforcing bar 18 is disposed relative to the link so as to lie against the "low" portions of the twisted link side legs when viewed from the tire engaging side thereof, while at the same time avoiding interferences with free interlinking relative movements of the adjacent chain links. The links are so twisted and the cross bars are so dimensioned and positioned thereon that they cooperate as illustrated at Fig. 2 with the relatively high end portions of the links 16 to provide therebetween a broad and substantially level base for bearing against the tread portion of the wheel tire.

Thus, the cross chain member includes at the tread portion thereof a plurality of traction links which are each formed to present a broad base of substantially smooth and flat form against the wheel tire, whereby the cross chain does not tend to cut into and damage the tread of the vehicle wheel tire. Also, this arrangement assists in resisting the tendencies of such cross chains to "roll" under the tire tread; and thus the traction "grip" side of the chain is always presented to the roadway and the relatively smooth side of the chain is always maintained against the tire tread.

As illustrated more particularly in Figs. 2–3, the opposite ends of the cross bar pieces 18 are welded as indicated at 22 to the links and are crimped downwardly at each side of the corresponding link toward the roadway surface and then slightly inwardly so as to provide the reinforcing bar in its final form to be substantially C-shaped as viewed in side elevation (Fig. 3). However, in the case of the present invention the ends 20—20 of the bars are at the same time twisted out of relative alignment as clearly shown in Fig. 1 so that they nest around the side legs of the link 16 in a more perfectly fitted manner. This arrangement of the reinforcing bar relative to the link causes the bar to be "wrapped" around the side legs of the link 16 in the regions of the welded connections between the link and the reinforcing bar in an improved manner; and thus the welded connections between the links and the cross bars are mechanically reinforced in improved manner against road impact loads which transmit through the downwardly extending end prongs of the reinforcing bars, such as would otherwise tend to rupture the welds and separate the bars from the links. Also, this mode of bending the road contacting end portions of the reinforcing bars presents the sharp end corner portions 24 of the reinforcing bar legs to the roadway surface in staggered relation, and thereby provides an improved traction effect.

Thus, it will be appreciated that in the case of the present invention the connections between the link 16 and the bar 18 are reinforced in improved manner, while the bent-in end portions of the reinforcing bar members operate also to provide improved roadway gripping prongs which are adapted to cut into an icy road coating or the like to provide improved traction effects. Also, the relatively broad and flat back formation of the chain at the tire engaging side thereof reduces tendencies of the chain to "roll" under the tire tread, and thereby causes the traction side of the chain to be always presented to the roadway.

The bent end portions of the reinforcing bars take the major part of the road wear effects during the early life of the chains, and thereby protect the twisted link elements from road wear for a substantial time. Then, during the later life of the chain the links per se receive greater proportions of the wear and then function in road gripping manner until they are completely worn out. However, because the main body portion of the reinforcing bar is welded to the tire tread side of the chain link this bar piece "backs up" and transversely reinforces the link against "pull-a-part" breakage throughout the entire life of the link, whereas in the case of prior type bar-reinforced links the bars wear off first and then leave the links unprotected with the result that they often break and pull apart before they are actually worn out.

Although only one form of the invention has been shown and described in detail, it will be apparent to those skilled in the art that the invention is not so limited but that various changes may be made therein without departing from the spirit of the invention or the scope of the appended claim.

I claim:

A wheel tire traction chain link comprising a substantially 90° twisted link, and a reinforcing bar disposed to extend transversely of said link across and against the tire tread contacting side thereof, said reinforcing bar having end portions extending outwardly beyond and crimped downwardly around the side leg portions of said link at the relatively low portions thereof as viewed from the tire contacting side thereof while avoiding interferences with the linking of adjacent links into the end portions of said link, said bar having its opposite ends extending beyond the plan view sidewise configurations of said link and downwardly around the opposite side leg portions of said link in closely fitting wrapped around relation therewith, said bar ends terminating in diagonally extending inwardly and downwardly inclined portions disposed under the link and twisted out of relative alignment and toward the opposite ends of the link respectively, whereby said bar ends are disposed on opposite sides of the intermediate bar portion.

References Cited in the file of this patent

UNITED STATES PATENTS

| | | |
|---|---|---|
| 1,461,327 | Reyburn | July 10, 1923 |
| 2,562,964 | Stuller | Aug. 7, 1951 |